United States Patent
Thurston et al.

(10) Patent No.: US 8,789,104 B2
(45) Date of Patent: Jul. 22, 2014

(54) METHOD AND SYSTEM FOR SELECTIVE INITIAL TELEVISION CHANNEL DISPLAY

(75) Inventors: Nathaniel J. Thurston, Somerville, MA (US); Devin F. Hosea, Boston, MA (US)

(73) Assignee: Comcast IP Holdings I, LLC, Philadelphia, PA (US)

( * ) Notice: Subject to any disclaimer, the term of this patent is extended or adjusted under 35 U.S.C. 154(b) by 2041 days.

(21) Appl. No.: 10/269,918

(22) Filed: Oct. 11, 2002

(65) Prior Publication Data

US 2003/0084446 A1    May 1, 2003

Related U.S. Application Data

(60) Provisional application No. 60/339,082, filed on Oct. 22, 2001.

(51) Int. Cl.
*G06F 3/00* (2006.01)
*G06F 13/00* (2006.01)
*H04N 5/445* (2011.01)

(52) U.S. Cl.
USPC ............. 725/44; 725/39; 725/45; 725/46

(58) Field of Classification Search
USPC ............. 725/14, 131–132, 139, 151–152, 39, 725/44–46
See application file for complete search history.

(56) References Cited

U.S. PATENT DOCUMENTS

| | | | |
|---|---|---|---|
| 4,972,503 A * | 11/1990 | Zurlinden | 725/14 |
| 5,534,911 A | 7/1996 | Levitan | |
| 5,559,549 A | 9/1996 | Hendricks et al. | |
| 5,758,259 A | 5/1998 | Lawler | |
| 5,774,714 A * | 6/1998 | Thapar et al. | 725/28 |
| 5,990,885 A | 11/1999 | Gopinath | |
| 6,088,722 A * | 7/2000 | Herz et al. | 709/217 |
| 6,177,931 B1 * | 1/2001 | Alexander et al. | 725/52 |
| 6,317,881 B1 * | 11/2001 | Shah-Nazaroff et al. | 725/24 |
| 6,449,767 B1 * | 9/2002 | Krapf et al. | 725/110 |
| 6,792,616 B1 * | 9/2004 | Jerding et al. | 725/38 |
| 6,851,090 B1 * | 2/2005 | Gutta et al. | 715/716 |
| 7,739,335 B2 * | 6/2010 | Siegel et al. | 709/206 |
| 2003/0066077 A1 * | 4/2003 | Gutta et al. | 725/34 |
| 2003/0093792 A1 * | 5/2003 | Labeeb et al. | 725/46 |
| 2006/0242665 A1 * | 10/2006 | Knee et al. | 725/38 |

FOREIGN PATENT DOCUMENTS

| | | | | |
|---|---|---|---|---|
| EP | WO 00/49802 | * | 8/2000 | H04N 5/50 |
| WO | WO 0049802 | * | 2/2000 | H04N 5/50 |

* cited by examiner

*Primary Examiner* — Nnenna Ekpo
(74) *Attorney, Agent, or Firm* — Banner & Witcoff, Ltd.

(57) ABSTRACT

A novel electronic program guide (EPG) based method and system for the distribution and display of programs enables the system service provider to determine which program a subscriber will initially see upon power-up of the subscriber's television receiver. The service provider maintains one or more Initial Program Display Tables that list information about programs to be displayed upon power-up of subscribers' receivers, from highest to least priority. The Initial Program Display Table or Tables are periodically transmitted to all subscribers and stored by the subscribers' set-top boxes. Upon power-up of a subscriber's receiver, the set-top box will attempt to cause the receiver to immediately display the highest ranked program from the Initial Program Display Table. The service provider controls which programs are displayed upon initial power-up and the ranking of programs in the case where there is difficulty displaying the highest ranked program.

17 Claims, 2 Drawing Sheets

METHOD AND SYSTEM FOR SELECTIVE INITIAL TELEVISION CHANNEL DISPLAY

PRIORITY CLAIM

Figure 1:
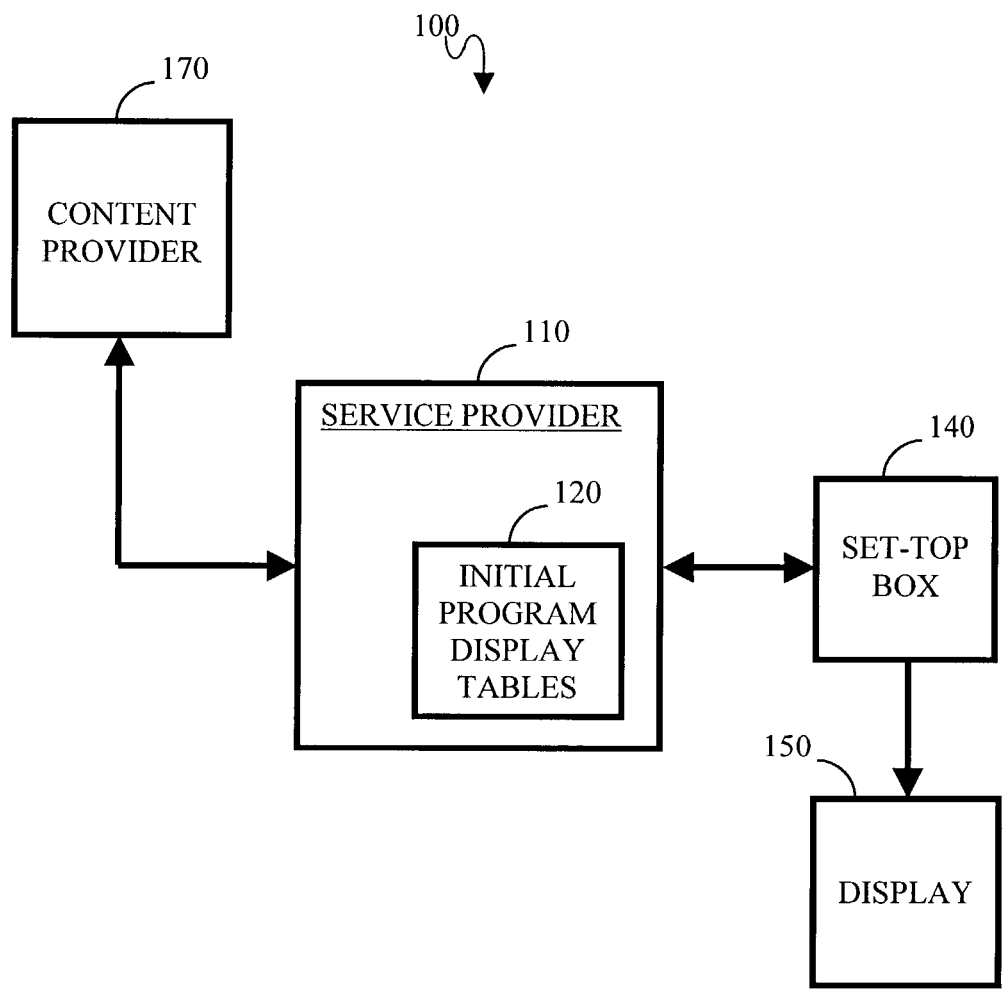

The present application claims priority to co-pending Provisional Application Ser. No. 60/339,082 entitled "Method and System for Selective Initial Television Channel Display", filed on Oct. 22, 2001, and having a common inventive entity.

BACKGROUND OF THE INVENTION

1. Field of the Invention

The present invention broadly relates to multiple-subscriber program distribution and display systems, such as those involving cable, satellite, and line-of-sight television broadcast delivery methods.

2. Background

Television receivers and television reception systems (including those which make use of a set-top box) are typically designed to function in one of two ways when the receiver is turned on for viewing programs: the receiver remains on the same channel that was being viewed when it was turned off at the end of the previous viewing session; or, the receiver is always re-tuned to the same default channel when it is turned on at the beginning of each new viewing session. This feature is observed whether the television receiver is a stand-alone device, or whether it is combined with other tuning/reception devices or circuits (e.g., set-top boxes) as part of a television broadcast/distribution system using any of a variety of delivery methods, including, for example, cable, satellite, and line-of-sight.

When the television reception system uses an Electronic Program Guide (EPG) the default channel may be a channel displaying the general or first screen of the EPG to provide a user/subscriber with information on current and future programs broadcast over the system. As is known in the art, the EPG, in addition to providing links to the programs available to the subscriber, can also provide additional information about programs, such as the channels, start and stop times, program lengths, program ratings, program genres, and program descriptions and synopses.

After the television receiver is turned on and maintained on the previously viewed channel or set to the routine default channel, the subscriber/user is then free to change channels and view desired programming.

While subscribers in a television broadcast/distribution system may find little or no problems with the aforementioned power-up initial channel settings, this arrangement represents loss of revenue and promotional opportunities for the system service providers. That is, by receivers automatically tuning to the same channel viewed at the end of the previous session, which channel was chosen by the viewer, the service provider does not have the opportunity to more directly influence subscribers' viewing habits during the initial viewing stage. The same drawback is present in systems where the exact same default channel is tuned to when the receiver is turned on, since the service provider might like to have the subscribers' initial attention drawn elsewhere.

SUMMARY OF THE INVENTION

In view of the aforementioned limitations of the prior art, the present invention provides a method of setting a subscriber's program reception device to an initial program. The method at least includes the steps of, via a service provider, broadcasting a plurality of programs for viewing or reproduction, via a receiver, receiving the plurality of programs, at the direction of the service provider, selecting for initial viewing or reproduction on the program reception device, a program chosen by the service provider, and enabling the initial viewing or reproduction by the subscriber, of the program selected.

The present invention also provides a program broadcast/distribution system. The system at least includes, a service provider adapted to broadcast a plurality of programs for viewing or reproduction, and a receiver adapted to receive the plurality of programs. The service provider is adapted to select for initial viewing or reproduction on the program reception device, an initial program chosen by the service provider. The receiver is adapted to enable the initial viewing or reproduction by the subscriber, of the initial program selected by the service provider.

BRIEF DESCRIPTION OF THE DRAWING FIGURES

Figure 2:
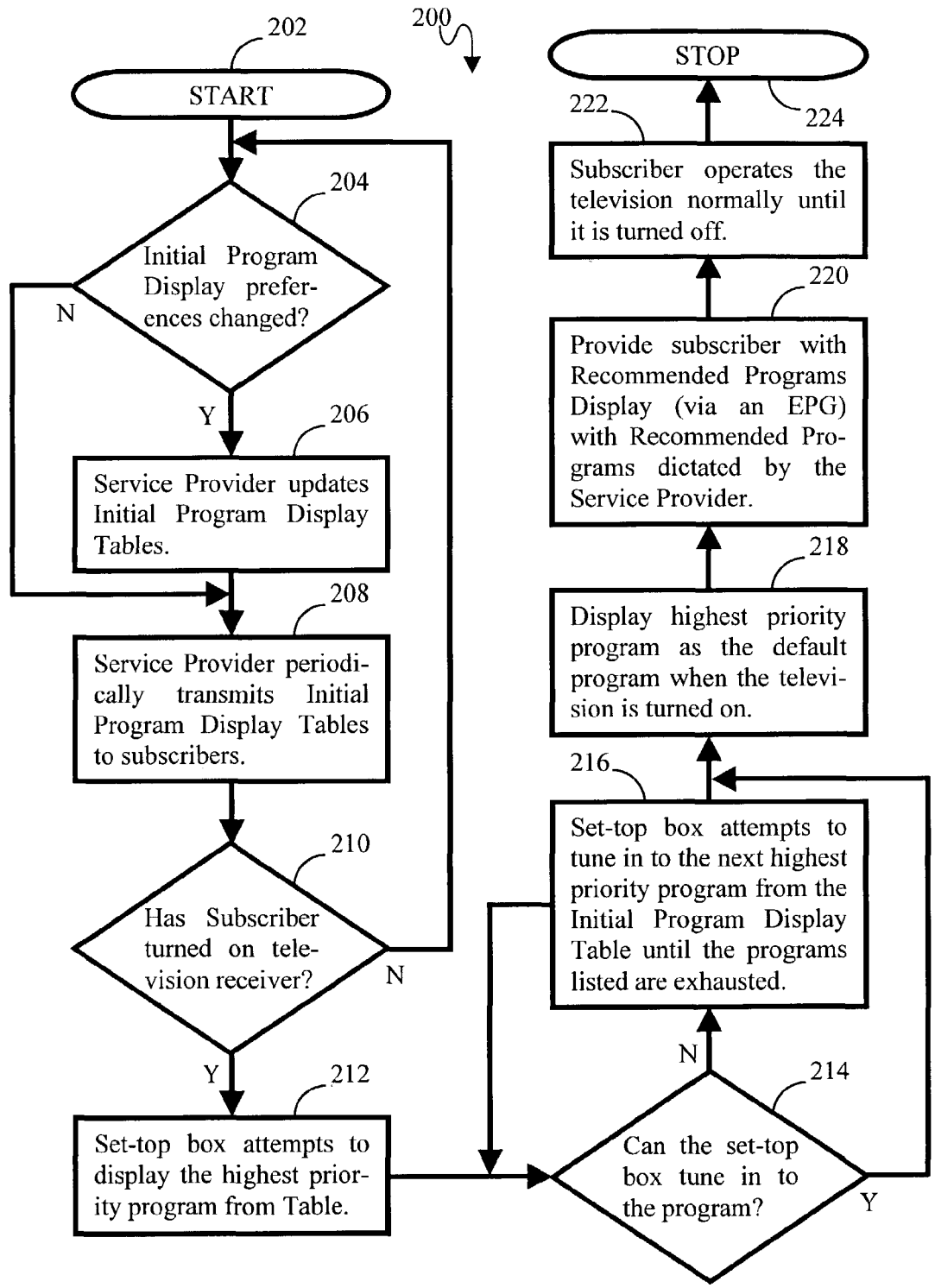

Features and advantages of the present invention will become apparent to those skilled in the art from the description below, with reference to the following drawing figures, in which:

FIG. 1 is a schematic block diagram of the present-inventive program distribution and display system; and FIG. 2 is a flow chart detailing the steps of the algorithm of the present-inventive method for initially displaying programs upon power-up of a subscriber's viewing hardware.

DESCRIPTION OF THE PREFERRED EMBODIMENTS

A system 100 capable of implementing the present-inventive method for establishing (by the Service Provider) the initial program to which the television receiver will be tuned upon power up, is shown in FIG. 1. The system 100 nominally includes a Service Provider 110 and many set-top boxes 140 serving system subscribers. The set-top boxes 140 can be of the variety found in many cable or satellite television systems, with the ability to both receive and transmit information. The set-top boxes 140 generate the EPGs used by the system, and place the programs received from the Service Provider in a format suitable for display on displays such as the one 150.

Among the many components of the Service Provider function, are the novel inclusion of an Initial Program Display Table or Tables 120, for storing the initial programs to be displayed upon receiver power-up. And, the system 100 also includes many program sources, such as the one 170 symbolically representing a content provider.

The Initial Program Display Table lists by priority, the programs to be initially displayed. It is possible to operate the present invention with only one initial program selected by the Service Provider. However, a better approach is to include a list of initial programs that are ranked, in case there is difficulty (by the receiver) locating or displaying particular initial programs selected.

With the aid of the present invention, the Service Provider can by commercial arrangement with content providers and advertisers, decide which program subscribers will initially see when the subscriber turns on his/her television receiver. For example, a content provider might pay the Service Provider a premium to have his/her program available to capture the initial and undivided attention of the subscribers, before the subscribers have had a chance to change channels.

The Initial Program Display Table or Tables can include, in addition to the name of each program, a program channel identifier, a program start time, a program end time, a program weight, and a program maximum probability. The program weight and maximum probability are used to establish a hierarchy among programs to be initially displayed, in case a subscriber's set-top box has difficulty tuning to the first choice. The set-top box would then automatically attempt to tune to the highest ranked program according to the table, until one is initially displayed.

One Initial Program Display Table can serve all of the subscribers in the system. Alternatively, a separate Initial Program Display Table can be transmitted to designated subscribers who are grouped according to common characteristics or demographics.

The general algorithm 200 employed by the present invention is illustrated in FIG. 2. The algorithm is partially implemented by the Service Provider and partially implemented by the set-top boxes.

After the start (Step 202), the algorithm 200 determines whether there is to be a change in the Initial Program Display Table (Step 204). For example, since the last update to the Initial Program Display Table 120, the Service Provider might have reached a new agreement with a content provider to initially feature the content provider's program with subscribers upon the subscribers turning on their television receivers. If there is to be a change to the Initial Program Display Table, this is accomplished in Step 206. Otherwise, the algorithm advances to Step 208, where the Initial Program Display Table is periodically transmitted to subscribers.

If a subscriber has turned on his or her television receiver, the set-top box converts the Initial Program Table information into channel information, and then attempts to tune to the highest priority program from the Table (Steps 210 and 212). If the subscriber has not turned on the television receiver, the algorithm returns to Step 204.

If the set-top box can successfully tune to the program indicated by the Initial Program Display Table, that program is initially displayed upon power-up of the television receiver (Steps 214 and 218). If not, the set-top box attempts to tune to the next highest priority program from the Initial Program Display Table (Step 216).

In Step 220, the Service Provider provides a recommended programs list to the set-top boxes, which list can be displayed via an EPG. The recommended programs list can be constructed according to agreement with content providers, and unbeknownst to users. For example, a content provider wishing to have his or her program widely viewed can through payment and agreement, have his or her program appear first on the recommended programs list of all of the viewers/users serviced by the Service Provider. The Recommended Programs List can automatically appear on the user's display at the beginning of each viewing session. Users would be more likely to at least initially tune-in to the recommended programs. As an additional value-added service, the Service Provider can highly recommend a particular content provider's program to those users who are more likely to have an interest.

The subscriber then operates the television receiver normally, starting with Step 222. The algorithm stops at Step 224.

Variations and modifications of the present invention are possible, given the above description. However, all variations and modifications which are obvious to those skilled in the art to which the present invention pertains are considered to be within the scope of the protection granted by this Letters Patent.

What is claimed is:

1. A method comprising:
   transmitting content items;
   generating data describing a hierarchical ranking of the content items that is configured to be usable by a first device and a second device to determine channel information for attempting to present one or more of the content items, and is configured to cause the first device and the second device to be controlled to:
     attempt to present, upon initially being caused to present content, a first content item having a highest ranking within the hierarchical ranking of the content items based on the channel information, and
     proceed, if unable to present the first content item, through the hierarchical ranking of the content items in rank order until a second content item within the hierarchical ranking of the content items is presentable; and
   transmitting the data describing the hierarchical ranking of the content items to the first device and the second device.

2. The method of claim 1, wherein the first device is associated with a first user and the second device is associated with a second user that is different from the first user, and wherein the method further comprises:
   designating the first user and the second user into a respective group according to a common characteristic or demographic; and
   transmitting the data describing the hierarchical ranking of the content items to a plurality of devices that are associated with designated users of the group, wherein the transmitting of the data describing the hierarchical ranking of the content items to the plurality of devices that are associated with designated users of the group comprises the transmitting of the data describing the hierarchical ranking of the content items to the first device and second device.

3. The method of claim 1, further comprising:
   transmitting recommendation information to the first device for display via an Electronic Guide (EG), wherein the recommendation information is configured with content recommendations according to an agreement with a content provider or advertiser.

4. A system comprising:
   a first device and a second device; and
   a service providing component configured to:
     transmit content items;
     generate data describing a hierarchical ranking of the content items that is configured to be usable by the first device and the second device to determine channel information for attempting to present one or more of the content items, and is configured to cause the first device and the second device to be controlled to:
       attempt to present, upon initially being caused to present content, a first content item having a highest ranking within the hierarchical ranking of the content items based on the channel information, and
       proceed, if unable to present the first content item, through the hierarchical ranking of the content items in rank order until a second content item within the hierarchical ranking of the content items is presentable, and
     transmit the data describing the hierarchical ranking of the content items to the first device and the second device.

5. The system of claim 4, wherein the first device is associated with a first user and the second device is associated with a second user that is different from the first user, and wherein the service providing component is further configured to:

designate the first and the second user into a respective group according to a common characteristic or demographic; and transmit the data describing the hierarchical ranking of the content items to a plurality of devices that are associated with designated users of the group, wherein the transmitting of the data describing the hierarchical ranking of the content items to the plurality of devices that are associated with designated users of the group comprises the transmitting of the data describing the hierarchical ranking of the content items to the first device and the second device.

6. The system of claim 4, wherein the service providing component is further configured to:

transmit recommendation information to the first device and the second device for display via an Electronic Guide (EG), wherein the recommendation information is configured with content recommendations according to agreement with a content provider or advertiser.

7. A system, comprising:

a computing device configured to transmit data describing a hierarchical ranking of content items to a plurality of reception devices; and the plurality of reception devices, wherein each of the plurality of reception devices is configured to be controlled to:

use the data describing the hierarchical ranking of content items to determine channel information for attempting to present one or more of the content items;

upon power-up, attempt to cause presentation of a first content item having a highest ranking within the hierarchical ranking of content items based on the channel information; and proceed, if unable to cause presentation of the first content item, through the hierarchical ranking of content items in rank order until a second content item within the hierarchical ranking of content items is presentable.

8. The system of claim 7, wherein at least one of the plurality of reception devices comprises a set-top box.

9. The method of claim 1, further comprising: generating the data describing the hierarchical ranking of the content items to comprise a weight and a maximum probability that determines the rank order.

10. The system of claim 4, wherein the data describing the hierarchical ranking of the content items comprises a weight and a maximum probability that determines the rank order.

11. The system of claim 7, wherein the plurality of reception devices correspond to users having a common characteristic or demographic.

12. The system of claim 7, wherein the computing device is configured to provide service to each of the plurality of reception devices.

13. The system of claim 7, wherein the computing device being configured to transmit the data describing the hierarchical ranking of content items to the plurality of reception devices comprises being configured to transmit the data describing the hierarchical ranking of content items to the plurality of reception devices via a broadcast over a content distribution network.

14. The system of claim 7, wherein each of the plurality of reception devices being configured to be controlled to attempt to cause presentation of the first content item comprises being configured to attempt to tune to the first content item based on the channel information; and wherein the proceeding through the hierarchical ranking of content items is performed if unable to successfully tune to the first content item.

15. The system of claim 4, wherein the service providing component being configured to transmit the content items comprises being configured to transmit the content items via a first broadcast over a content distribution network; and wherein the service providing component being configured to transmit the data describing the hierarchical ranking of the content items to the first device and the second device comprises being configured to transmit the data describing the hierarchical ranking of the content items to the first device and the second device via a second broadcast over the content distribution network.

16. The method of claim 1, wherein the transmitting of the content items is via a first broadcast over a content distribution network; and wherein the transmitting of the data describing the hierarchical ranking of the content items to the first device and the second device is via a second broadcast over the content distribution network.

17. A method, comprising:

receiving, at a receiving device, data describing a hierarchical ranking of content items that is usable to determine channel information for attempting to present one or more of the content items;

using the data describing the hierarchical ranking of content items to determine the channel information;

attempting, upon power-up of the receiving device, to cause presentation of a first content item having a highest ranking within the hierarchical ranking of content items based on the channel information; and proceeding, if unable to cause presentation of the first content item, through the hierarchical ranking of content items in rank order until a second content item within the hierarchical ranking of content items is presentable.

* * * * *

UNITED STATES PATENT AND TRADEMARK OFFICE
CERTIFICATE OF CORRECTION

| | | |
|---|---|---|
| PATENT NO. | : 8,789,104 B2 | Page 1 of 1 |
| APPLICATION NO. | : 10/269918 | |
| DATED | : July 22, 2014 | |
| INVENTOR(S) | : Nathaniel J. Thurston | |

It is certified that error appears in the above-identified patent and that said Letters Patent is hereby corrected as shown below:

In The Claims

Column 5, Claim 5, Line 4:
In Claim 5, after "first", please insert --user--

Signed and Sealed this
Twenty-fourth Day of March, 2015

Michelle K. Lee
*Director of the United States Patent and Trademark Office*